United States Patent
Ahn et al.

(10) Patent No.: US 6,632,348 B2
(45) Date of Patent: Oct. 14, 2003

(54) WIRE ETCHING DEVICE AND METHOD

(75) Inventors: Hyo Sok Ahn, Seoul-si (KR); Choong Hyun Kim, Seoul-si (KR); Doo In Kim, Seoul-si (KR)

(73) Assignee: Korea Institute of Science and Technology, Seoul (KR)

( * ) Notice: Subject to any disclaimer, the term of this patent is extended or adjusted under 35 U.S.C. 154(b) by 304 days.

(21) Appl. No.: 09/854,553

(22) Filed: May 15, 2001

(65) Prior Publication Data

US 2002/0063066 A1 May 30, 2002

(30) Foreign Application Priority Data

Nov. 28, 2000 (KR) .......................... 2000-71288

(51) Int. Cl.$^7$ .............. C25F 3/02; C25D 17/00; C25B 15/00
(52) U.S. Cl. .............. 205/645; 205/664; 204/224 M; 204/229.8
(58) Field of Search .............. 204/224 M, 206, 204/229.8; 205/645, 664

(56) References Cited

U.S. PATENT DOCUMENTS

| | | |
|---|---|---|
| 4,375,396 A | 3/1983 | Green et al. |
| 5,286,355 A | 2/1994 | Fainchtein et al. |
| 5,630,932 A * | 5/1997 | Lindsay et al. .............. 205/645 |

* cited by examiner

Primary Examiner—Donald R. Valentine
(74) Attorney, Agent, or Firm—Birch, Stewart, Kolasch & Birch, LLP (57) ABSTRACT

A device and method for etching a wire to manufacture it into a tip for a scanning probe microscope or the like. The wire etching device generates a voltage signal for determining the level of a wire etching voltage, and applies the etching voltage of the level determined depending on the generated voltage signal to the wire to primarily etch it. The wire etching device measures the amount of etching current generated during the primary etching process and controls the level of the voltage signal according to the measured etching current amount so as to control the level of the etching voltage. Then, the device secondarily etches the wire with the level-controlled voltage signal. Therefore, the wire etching device can manufacture the tip while controlling its curvature radius and aspect ratio and reducing the amount of oxide on its surface. This has the effect of manufacturing the tip precisely according to a scanning purpose of an atomic force microscope or scanning tunneling microscope and a feature of a sample to be measured.

10 Claims, 6 Drawing Sheets

WIRE ETCHING DEVICE AND METHOD

BACKGROUND OF THE INVENTION

1. Field of the Invention

The present invention relates in general to wire etching devices and methods, and more particularly to a wire etching device and method wherein an etching operation is performed only once to etch a wire, thereby controlling a curvature radius and aspect ratio of the wire and reducing the amount of surface oxide of the wire.

2. Description of the Prior Art

At the present time, microscopes are required to observe materials up to a very fine unit. Scanning probe microscopes (SPMs) have been developed to meet such requirements. These SPMs are third-generation microscopes, next to first-generation light microscopes and second-generation electron microscopes, which have broken a common idea that atoms are so small in size (0.1–0.5 nm) as to be unable to be observed through even the best microscope. Whereas the light microscopes have a maximum of thousands of magnifications and the electron microscopes have a maximum of hundreds of thousands of magnifications, the SPMs have a maximum of tens of millions of magnifications to observe atoms individually.

Among the SPMs, an atomic force microscope (AFM) and a scanning tunneling microscope (STM) each comprise a tip formed by etching a thin wire such that it is sharply pointed at its end. The AFM or STM observes a sample using a tunneling effect, gravitation and repulsive force occurring between the tip and the sample under the condition that the tip is in close proximity to the surface of the sample at a distance (~0.5 nm) of the size of one or two atoms.

Until now, there have been reported many techniques and methods for manufacturing tips using wires. Among them, methods based on an electrochemical etching process have been often used in that they are relatively simple. However, these etching-based tip manufacturing methods are mostly empirical methods with little reproducibility.

The tip is of particular importance in its shape and a curvature radius at its end for special use. However, in the case where the above-mentioned empirical electrochemical etching process is performed to manufacture the tip, it is not easy to observe the shape of the tip with the naked eye during the manufacturing process, resulting in the manufacturing of the tip being very difficult. Further, it is hard to manufacture tips of the same shape while minimizing curvature radius thereof.

In order to overcome the above problems, there has been proposed an electrochemical etching process-based tip manufacturing method, which is disclosed in U.S. Pat. No. 4,375,396. This is a basic method for manufacturing a tip using a wire. This method is adapted to measure the amount of etching current and interrupt the etching current when the amount thereof reaches a threshold value.

In addition, a mechanism for controlling the position of a wire during an etching process is shown in U.S. Pat. No. 5,286,355. In this mechanism, at the moment that the amount of etching current reaches a threshold value set through pre-experiments, the etching current is interrupted, thereby reducing a curvature radius at the end of a tip.

However, the above-mentioned conventional techniques can desirably reduce the curvature radius at the end of the tip, but are disadvantageous in that they cannot control another important factor, or an aspect ratio, in applying the tip to an atomic force microscope or scanning tunneling microscope.

In other words, in the case where the above-mentioned electrochemical etching process is performed to manufacture a tip, the manufactured tip is reduced in aspect ratio but increased in surface oxide amount when the etching current is larger in amount, whereas it is smoother in surface and smaller in curvature radius but greater in aspect ratio when the etching current is smaller in amount.

SUMMARY OF THE INVENTION

Therefore, the present invention has been made in view of the above problems, and it is an object of the present invention to provide a wire etching device and method which can control a curvature radius and aspect ratio of a tip in manufacturing the tip using a wire.

It is another object of the present invention to provide a wire etching device and method which can reduce the amount of oxide on the surface of a tip to smooth the surface, in manufacturing the tip using a wire.

In accordance with one aspect of the present invention, the above and other objects can be accomplished by the provision of a wire etching device comprising a signal generator for generating a voltage signal; a voltage generator for generating an etching voltage in response to the voltage signal from the signal generator; an etching unit for etching a wire with the etching voltage from the voltage generator; a current measurement unit for measuring the amount of etching current generated by the etching unit; and a controller for changing the level of the voltage signal to be generated by the signal generator, in accordance with the etching current amount measured by the current measurement unit, so as to change the level of the etching voltage to be generated by the voltage generator.

In accordance with another aspect of the present invention, there is provided a wire etching method comprising the first step of generating a voltage signal for determining the level of a wire etching voltage; the second step of applying the etching voltage of the level determined depending on the voltage signal to a wire to primarily etch it; the third step of measuring the amount of etching current generated while the wire is primarily etched at the above second step; the fourth step of changing the level of the voltage signal according to the etching current amount measured at the above third step to change the level of the etching voltage; the fifth step of applying the etching voltage of the level changed at the above fourth step to the wire to secondarily etch it; and the sixth step of measuring a variation of the etching current generated while the wire is secondarily etched at the above fifth step and completing the etching operation if the measured etching current variation is greater than or equal to a predetermined value.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Study results show that the level of an etching voltage appropriate for the manufacturing of a tip using a wire is about 5V although it is different depending on a variety of conditions such as the concentration of an electrolyte, etc. If the etching voltage level is higher than the appropriate level of 5V, the manufactured tip is reduced in aspect ratio but increased in surface oxide amount. To the contrary, in the case where the etching voltage level is lower than the appropriate level of 5V, the manufactured tip is increased in aspect ratio but reduced in surface oxide amount and curvature radius.

On the basis of the above principles, the present invention provides a wire etching device for controlling the level of a wire etching voltage to control a curvature radius at the end of a tip and an aspect ratio of the tip and reduce the amount of surface oxide of the tip.

Figure 1:
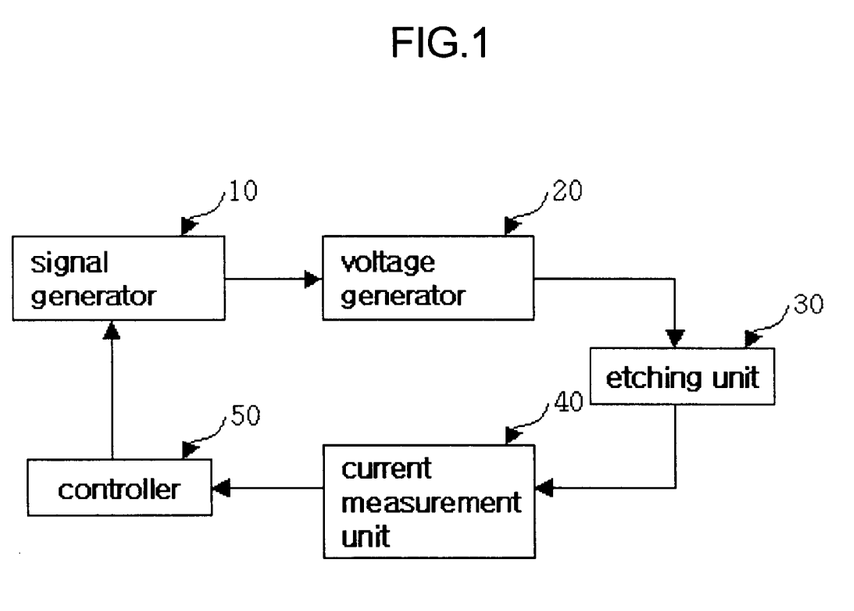
FIG. 1 is a block diagram showing the construction of a wire etching device in accordance with the present invention.

With reference to FIG. 1, there is shown in block form the construction of a wire etching device in accordance with the present invention. As shown in this drawing, the wire etching device comprises a signal generator 10 for generating a voltage signal for the generation of an etching voltage set by a user, a voltage generator 20 for generating the etching voltage in response to the voltage signal from the signal generator 10, an etching unit 30 for etching the end of a wire with the etching voltage from the voltage generator 20, a current measurement unit 40 for measuring the amount of etching current generated by the etching unit 30, and a controller 50 for controlling the level of the voltage signal to be generated by the signal generator 10, in accordance with the etching current amount measured by the current measurement unit 40.

Figure 2:
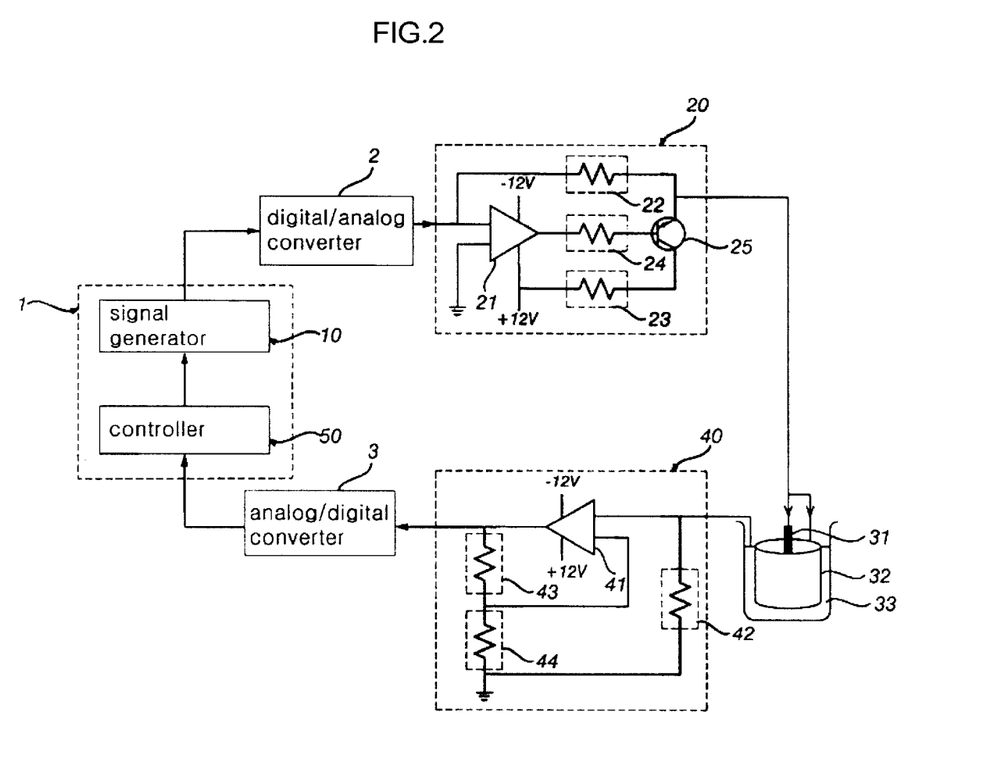
FIG. 2 is a detailed circuit diagram of an embodiment of the wire etching device in accordance with the present invention.

The signal generator 10 and controller 50 may preferably be provided in a computer 1, as shown in FIG. 2.

With reference to FIG. 2, the signal generator 10 primarily generates a voltage signal for the generation of an etching voltage set by the user and outputs the generated voltage signal to a digital/analog converter 2. Then, the digital/analog converter 2 converts the voltage signal from the signal generator 10 into an analog voltage signal and outputs the converted analog voltage signal to the voltage generator 20.

The voltage generator 20 may preferably be a current-to-voltage converter, which is a kind of amplifier. As shown in FIG. 2, the voltage generator 20 includes a first operational (OP) amplifier 21 for amplifying the voltage signal from the digital/analog converter 2 in the ratio of impedances of first and second resistors 22 and 23, a third resistor 24 connected to an output terminal of the first OP amplifier 21 at its one end, and a transistor 25 connected to the other end of the third resistor 24 for amplifying a voltage across the third resistor 24.

With the above-described construction, the voltage generator 20 generates a first etching voltage by amplifying an input analog voltage signal, and applies the generated first etching voltage to a wire 31 and stainless steel cylinder 32 in the etching unit 30. Preferably, the wire 31 is a tungsten wire with a diameter of 100 μm to be manufactured into a tip, and the stainless steel cylinder 32 acts as an electrode in response to the etching voltage applied thereto.

An electrochemical etching process is generally performed according to an electrochemical reaction based on current flowing through two electrodes immersed in an electrolyte. In this regard, the wire 31 and stainless steel cylinder 32 form first and second electrodes in response to the etching voltage applied thereto, respectively.

In a sodium hydroxide (NaOH) electrolyte 33 where the wire 31 and stainless steel cylinder 32 are immersed, current for etching of the wire 31 is generated with the formation of the first and second electrodes.

The amount of the generated etching current is measured by the current measurement unit 40, converted into a digital value by an analog/digital converter 3 and then applied to the controller 50.

The current measurement unit 40 includes a fourth resistor 42 connected in series to an output terminal of the etching unit 30, and a second OP amplifier 41 for amplifying the amount of current flowing through the fourth resistor 42 in the ratio of impedances of fifth and sixth resistors 43 and 44 and outputting the amplified result to the controller 50. Preferably, the fourth resistor 42 has a lower impedance than that of the etching unit 30, and the amount of current flowing therethrough is in proportion to the amount of etching current generated by the etching unit 30.

The controller 50 calculates an etching voltage change current value for the level change of the voltage signal on the basis of the amount of initial etching current and a primary/secondary etching ratio. The initial etching current amount is the amount of current generated at the initial time that the wire 31 is etched, and the primary/secondary etching ratio is preset by the user. Then, the controller 50 compares the calculated etching voltage change current value with the amount of etching current, currently measured by the current measurement unit 40, to determine whether the two values are equal. If the two values are equal, the controller 50 outputs a control signal to the signal generator 10 to change the level of the voltage signal to be generated by the signal generator 10, so as to change the level of the etching voltage to be generated by the voltage generator 20.

Figure 3:
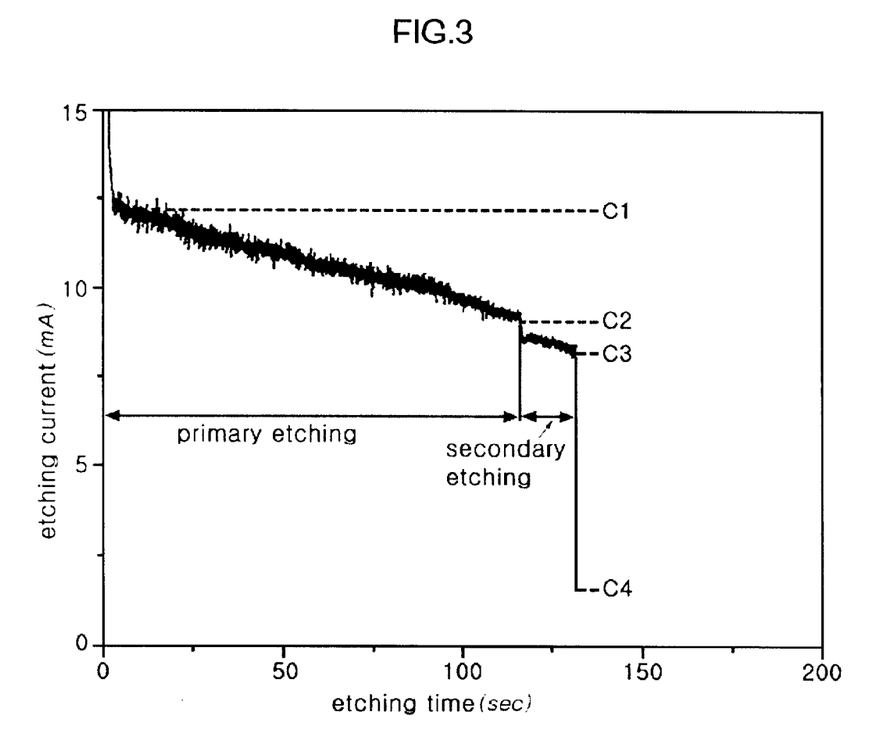
FIG. 3 is a graph showing variations of etching current in accordance with the present invention.

The amount of initial etching current C1 generated at the initial time that the wire is etched, as shown in FIG. 3, is different depending on a variety of conditions such as the concentration of a wire etching electrolyte, the etching voltage, the diameter of the wire, etc. Nevertheless, the ratio of the amount of later etching current C3 just before removal of the wire end, or before etching completion, to the initial etching current amount C1 is subjected to little variation, and the etching current is linearly reduced in amount as the etching operation advances. In this regard, the amount of later etching current C3 is determined according to the amount of initial etching current C1.

The primary/secondary etching ratio R preset by the user is defined as the ratio of the time required for application of the first etching voltage to the total time required for the wire etching operation, which can be expressed by the following equation 1.

$$R=(C1-C2)/(C1-C3) \qquad \text{[Equation 1]}$$

As a result, if the user sets the etching ratio R in consideration of the results obtained through experiments repeated, then the controller 50 determines an etching voltage change current value C2. Preferably, the user can determine the primary/secondary etching ratio R within the range of 0 to 1.

The controller 50 also observes variations of the etching current to complete the etching operation during a secondary etching process which is based on a second etching voltage generated according to a level-changed voltage signal from the signal generator 10. At the moment that the etching current varies by an amount preset through experiments, the controller 50 interrupts the etching voltage.

FIG. 3 shows measured variations of the etching current when the etching operation is performed by the etching device of the present invention. In order to measure variations of the etching current, primary and secondary etching processes are performed respectively on the basis of first and second etching voltages generated in an etching ratio set by the user. The first etching voltage is higher than the appropriate voltage of 5V, stated previously, and the second etching voltage is lower than the appropriate voltage.

For the primary etching process based on the first etching voltage, the wire is relatively large in its etched amount, and the tip is reduced in aspect ratio and increased in surface oxide amount. Alternatively, for the secondary etching process based on the second etching voltage, the amount of etching current generated in the electrolyte is reduced as compared with the primary etching process, and the wire is small in its etched amount as compared with the primary etching process. Further, the tip is reduced in surface oxide amount and small in curvature radius as compared with the primary etching process.

As seen from FIG. 3, the later etching current C3 just before etching completion abruptly varies to become completion etching current C4 for interruption of the etching voltage, which signifies that the lower end of the wire manufactured into the tip has been removed. As a result, if the currently measured etching current amount abruptly varies by a predetermined value or more and then reaches the completion etching current amount C4, the controller 50 interrupts the etching voltage to complete the etching operation.

Preferably, the signal generator 10 in the computer 1 is adapted to generate the voltage signal with no assistance from any separate power supply such that the voltage generator 20 generates the etching voltage. Further, the computer 1 stores a program based on an algorithm for change from the primary etching process to the secondary etching process, thereby allowing the controller 50 to manufacture the tip desired by the user by performing the etching operation only once on the basis of the set first etching voltage, second etching voltage and etching ratio.

The operation of the wire etching device with the above-stated construction in accordance with the present invention will hereinafter be described in detail with reference to FIG. 4

Figure 4:
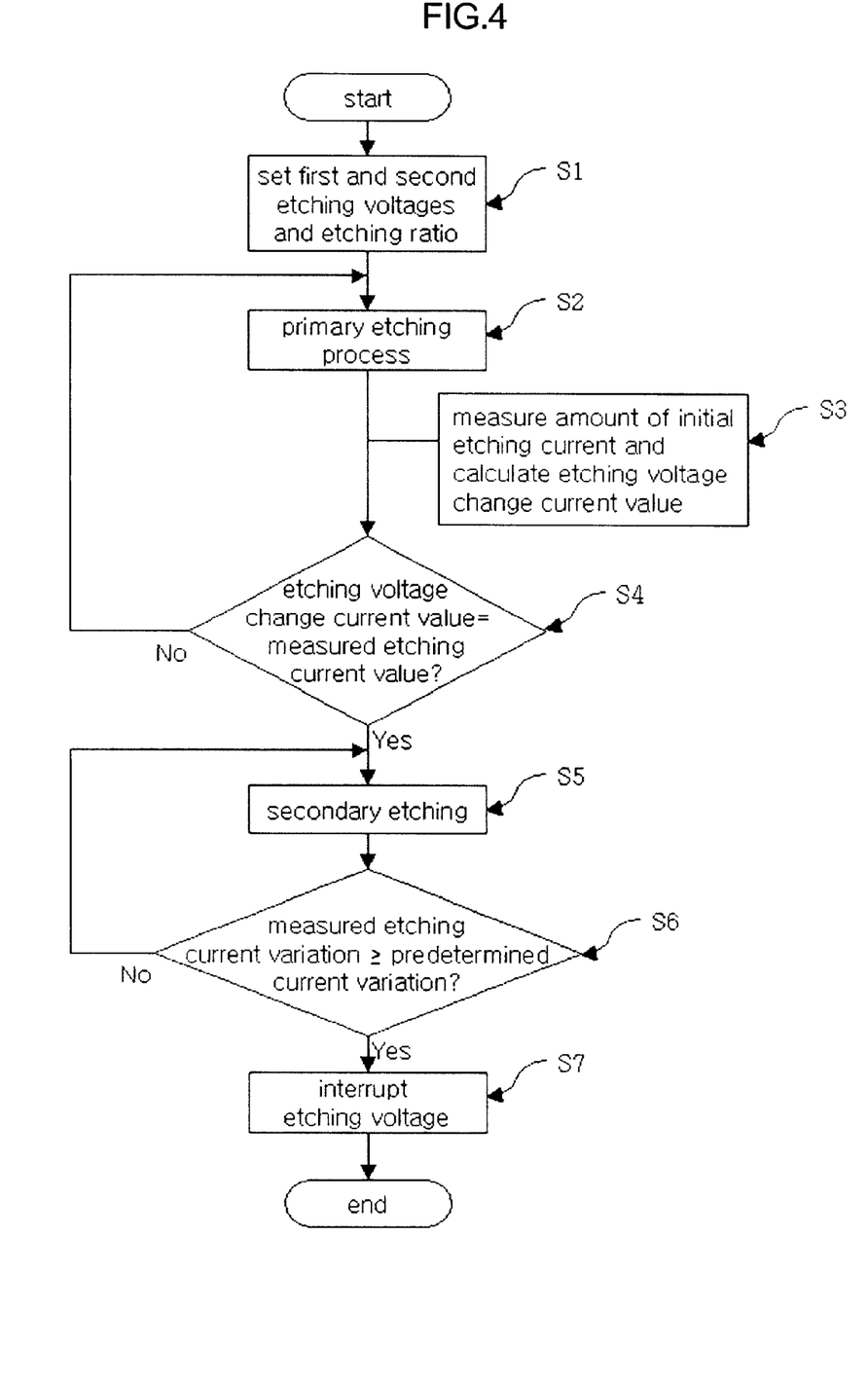
FIG. 4 is a flowchart illustrating a wire etching method in accordance with the present invention.

FIG. 4 is a flowchart illustrating a wire etching method in accordance with the present invention. At the first step S1, the user sets first and second etching voltages and an etching ratio and applies them to the controller 50 in the computer 1.

At the second step S2, the signal generator 10 in the computer 1 generates a primary voltage signal for the generation of the first etching voltage, which is then converted into an analog voltage signal by the digital/analog converter 2 and applied to the voltage generator 20. Then, the voltage generator 20 generates the first etching voltage in response to the analog voltage signal from the digital/analog converter 2 and applies it to the wire 31 and stainless steel cylinder 32, thereby causing etching current to be generated in the electrolyte 33. As a result, a primary etching process is performed based on the etching current generated in the electrolyte 33.

At the third step S3, for the primary etching process, the current measurement unit 40 measures the amount of initial etching current, which is then converted into a digital value by the analog/digital converter 3 and applied to the controller 50 in the computer 1. The controller 50 calculates an etching voltage change current value on the basis of the measured initial etching current amount and the etching ratio set by the user.

At the fourth step S4, the controller 50 compares the calculated etching voltage change current value with the amount of etching current, currently measured by the current measurement unit 40 in real time, to determine whether the two values are equal. If the calculated etching voltage change current value and the measured etching current amount are equal, the controller 50 completes the primary etching process.

At the fifth step S5, if the primary etching process is completed at the above fourth step S4, the controller 50 controls the signal generator 10 to output a secondary voltage signal to the voltage generator 20 for the generation of the second etching voltage. Then, the voltage generator 20 generates the second etching voltage in response to the secondary voltage signal and applies it to the wire 31 and electrode 32, thereby causing etching current to be generated in the electrolyte 33. As a result, a secondary etching process is performed based on the etching current generated in the electrolyte 33.

At the sixth step S6, for the secondary etching process, the controller 50 compares a variation of the etching current measured by the current measurement unit 40 with a predetermined current variation to determine whether the two values are equal.

At the seventh step S7, if it is determined at the above sixth step S6 that the measured etching current variation is greater than or equal to the predetermined current variation, the controller 50 blocks the signal output from the digital/analog converter 2 so as to interrupt the etching voltage.

FIG. 5 shows photographs of scanning electron microscopes (SEMs) having tungsten tips manufactured using a first etching voltage of 9V and a second etching voltage of 3V according to the present invention.

Figure 5A:
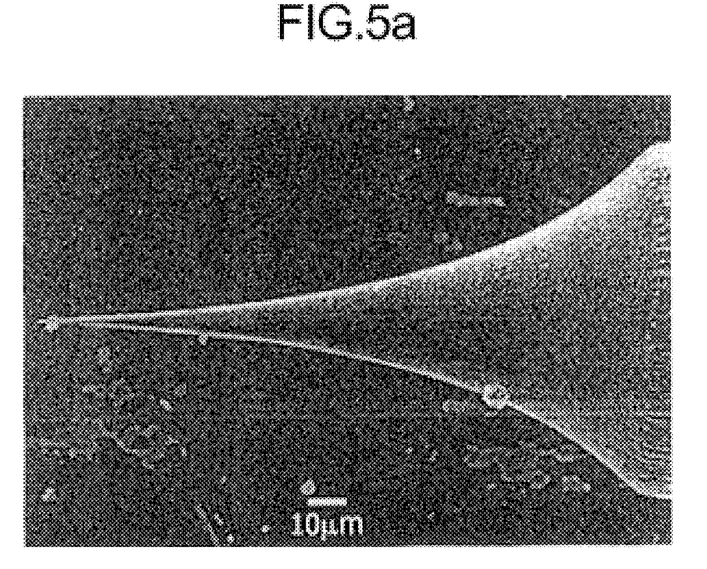
FIGS. 5a, 5b, 5c and 5d are views showing the shapes of tips manufactured according to the present invention.
Figure 5B:
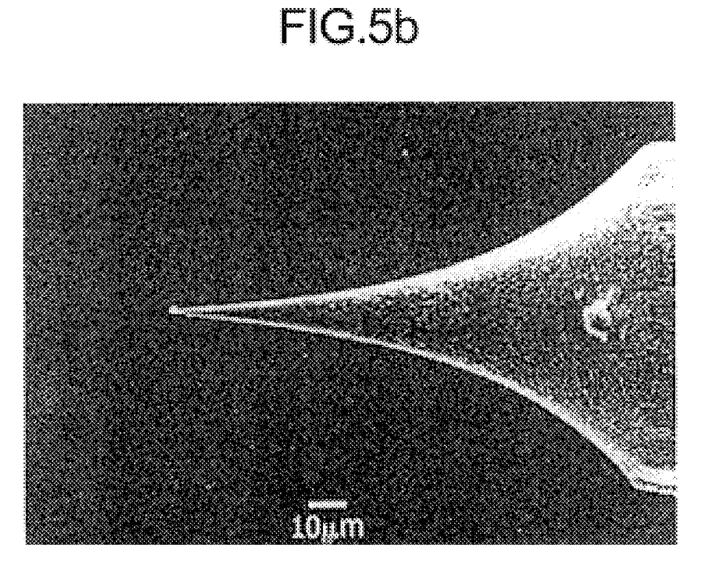

In FIG. 5a, the etching operation was performed with only the second etching voltage under the condition that the etching ratio R was set to 0. This drawing shows that the tungsten tip manufactured under the condition that the etching voltage was lower than the appropriate voltage had a smooth surface but a high aspect ratio. In FIG. 5b, the etching operation was performed with only the first etching voltage under the condition that the etching ratio R was set to 1. This drawing shows that the tungsten tip manufactured under the condition that the etching voltage was higher than the appropriate voltage had a low aspect ratio but a rough surface.

Figure 5C:
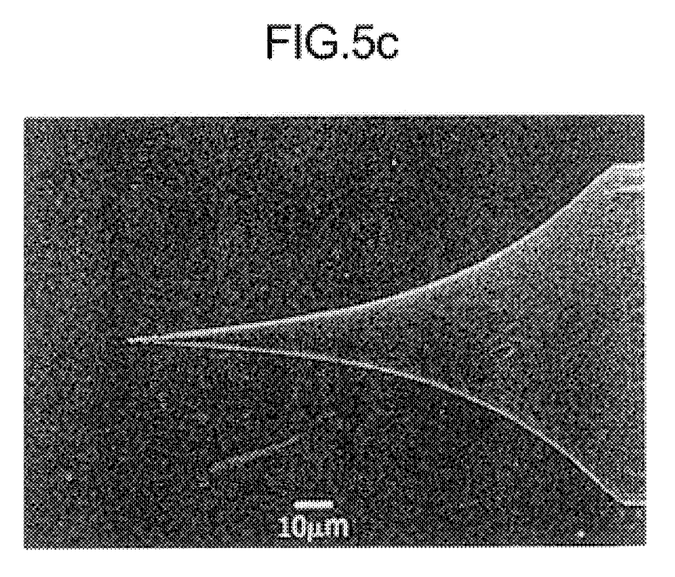
Figure 5D:
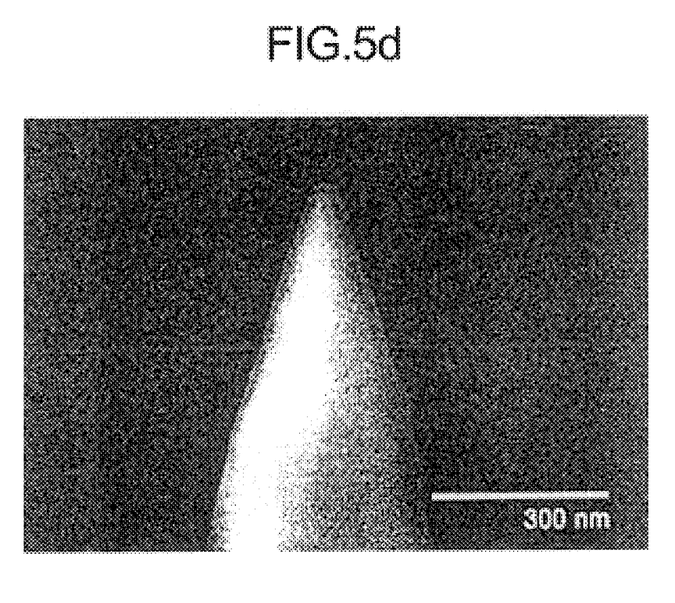

In FIG. 5c, the etching operation was performed with both the first and second etching voltages under the condition that the etching ratio R was set to 0.8. The aspect ratio of the manufactured tip was reduced by about 16% compared to that of FIG. 5a and the amount of oxide on the surface of the tip was also reduced, thereby making the surface smooth. FIG. 5d shows a measured curvature radius of the end of a tip manufactured according to the present invention. The manufactured tip had a curvature radius of about 30 nm.

As apparent from the above description, the present invention provides a device and method for etching a wire to manufacture it into a tip for a scanning probe microscope. The wire etching device generates a voltage signal for determining the level of a wire etching voltage, and applies the etching voltage of the level determined depending on the generated voltage signal to the wire to primarily etch it. The wire etching device measures the amount of etching current generated during the primary etching process and controls the level of the voltage signal according to the measured etching current amount so as to control the level of the etching voltage. Then, the device secondarily etches the wire with the level-controlled voltage signal. Therefore, the wire etching device can manufacture the tip while controlling its curvature radius and aspect ratio and reducing the amount of oxide on its surface. This has the effect of manufacturing the tip precisely according to a scanning purpose of an atomic force microscope or scanning tunneling microscope and features of a sample to be measured.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wire etching device comprising:

a signal generator for generating a voltage signal;

a voltage generator for generating an etching voltage in response to said voltage signal from said signal generator;

an etching unit for etching a wire with said etching voltage from said voltage generator;

a current measurement unit for measuring the amount of etching current generated by said etching unit; and a controller for changing the level of said voltage signal to be generated by said signal generator, in accordance with the etching current amount measured by said current measurement unit, so as to change the level of said etching voltage to be generated by said voltage generator.

2. A wire etching device as set forth in claim 1, wherein said voltage generator includes an amplifier for amplifying said voltage signal from said signal generator.

3. A wire etching device as set forth in claim 1, wherein said etching unit includes:

said wire forming a first electrode in response to said etching voltage from said voltage generator;

a cylinder for forming a second electrode in response to said etching voltage from said voltage generator; and an electrolyte for containing said wire and cylinder to etch said wire with said etching current flowing through said first and second electrodes.

4. A wire etching device as set forth in claim 1, wherein said controller is adapted to calculate an etching voltage change current value for the level change of said voltage signal on the basis of a predetermined primary/secondary etching ratio and the amount of initial etching current from said etching unit, compare the calculated etching voltage change current value with the etching current amount currently measured by said current measurement unit and control said signal generator in accordance with the compared result to change the level of said etching voltage to be generated by said voltage generator.

5. A wire etching device as set forth in claim 4, wherein said controller is adapted to, if the calculated etching voltage change current value is equal to the currently measured etching current amount, control said signal generator to change the level of said voltage signal.

6. A wire etching method comprising the steps of:

a) generating a voltage signal for determining the level of a wire etching voltage;

b) applying said etching voltage of the level determined depending on said voltage signal to a wire to primarily etch it;

c) measuring the amount of etching current generated while said wire is primarily etched at said step b);

d) changing the level of said voltage signal according to the etching current amount measured at said step c) to change the level of said etching voltage;

e) applying said etching voltage of the level changed at said step d) to said wire to secondarily etch it; and f) measuring a variation of the etching current generated while said wire is secondarily etched at said step e) and completing the etching operation if the measured etching current variation is greater than or equal to a predetermined value.

7. A wire etching method as set forth in claim 6, wherein said step d) includes the step of g) calculating an etching voltage change current value for the level change of said voltage signal on the basis of a predetermined primary/secondary etching ratio and the amount of initial etching current generated at said step b), comparing the calculated etching voltage change current value with the etching current amount measured at said step c) and changing the level of said voltage signal in accordance with the compared result.

8. A wire etching method as set forth in claim 7, wherein said step g) includes the step of calculating said etching voltage change current value on the basis of said predetermined primary/secondary etching ratio, the amount of initial etching current generated at said step b) and the amount of later etching current generated at said step e) using the following equation 1:

$$R = (C1 - C2)/(C1 - C3) \qquad \text{[Equation 1]}$$

where, R is the primary/secondary etching ratio, C1 is the amount of initial etching current, C2 is the etching voltage change current value and C3 is the amount of later etching current, said later etching current amount being the amount of etching current just before etching completion.

9. A wire etching method as set forth in claim 7, wherein said step g) includes the step of changing the level of said voltage signal if the calculated etching voltage change current value is equal to the etching current amount measured at said step c).

10. A wire etching method as set forth in claim 6, wherein said etching voltage level changed at said step d) is lower than said etching voltage level applied at said step b).

* * * * *